United States Patent
Balling

(10) Patent No.: US 11,522,419 B2
(45) Date of Patent: Dec. 6, 2022

(54) MANUFACTURING METHOD FOR A CAST STATOR OF AN ELECTRIC MACHINE

(71) Applicant: VALEO SIEMENS EAUTOMOTIVE GERMANY GMBH, Erlangen (DE)

(72) Inventor: Florian Balling, Bad Neustadt (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 362 days.

(21) Appl. No.: 16/717,116

(22) Filed: Dec. 17, 2019

(65) Prior Publication Data
US 2020/0195103 A1 Jun. 18, 2020

(30) Foreign Application Priority Data

Dec. 17, 2018 (DE) .................... 10 2018 132 501.0

(51) Int. Cl.
| | |
|---|---|
| *H02K 15/02* | (2006.01) |
| *H02K 7/00* | (2006.01) |
| *H02K 1/16* | (2006.01) |
| *H02K 15/12* | (2006.01) |
| *B29C 45/14* | (2006.01) |
| *B29C 45/40* | (2006.01) |
| *B29C 45/03* | (2006.01) |
| *H02K 5/20* | (2006.01) |
| *B29L 31/00* | (2006.01) |

(Continued)

(52) U.S. Cl.
CPC .......... *H02K 15/024* (2013.01); *B29C 45/03* (2013.01); *B29C 45/14* (2013.01); *B29C 45/40* (2013.01); *H02K 1/16* (2013.01); *H02K 5/203* (2021.01); *H02K 7/006* (2013.01); *H02K 15/12* (2013.01); *B29C 2045/0098* (2013.01); *B29L 2031/7498* (2013.01); *B60K 1/00* (2013.01); *B60K 6/26* (2013.01); *B60Y 2200/91* (2013.01); *B60Y 2200/92* (2013.01); *B60Y 2400/60* (2013.01)

(58) Field of Classification Search
None
See application file for complete search history.

(56) References Cited

U.S. PATENT DOCUMENTS

2014/0333158 A1* 11/2014 Tamaki .................. H02K 15/12
  310/43
2019/0363598 A1* 11/2019 Coppola .............. H02K 15/105

FOREIGN PATENT DOCUMENTS

| DE | 102014106361 A1 | 11/2014 |
| WO | 2006/005596 A1 | 1/2006 |

OTHER PUBLICATIONS

English Translation of WO 2006005596 (Year: 2006).*

(Continued)

*Primary Examiner* — Timothy Kennedy
*Assistant Examiner* — Olukorede Esan
(74) *Attorney, Agent, or Firm* — Manabu Kanesaka

(57) ABSTRACT

A method for manufacturing a stator for an electric machine, having the following steps: inserting a cast body with a nozzle from a first side of the stator into the stator, inserting a cast counterbody from a second opposing side of the stator into the stator, casting the stator with thermoplastic, thermosetting plastic, or resin by means of the nozzle, curing the thermoplastic, thermosetting plastic, or resin, wherein following the curing a cast-on piece of the thermoplastic, thermosetting plastic, or resin is sheared off using a rotational movement of the cast body or cast counterbody.

12 Claims, 7 Drawing Sheets

(51) Int. Cl.
*B29C 45/00* (2006.01)
*B60K 1/00* (2006.01)
*B60K 6/26* (2007.10)

(56) References Cited

OTHER PUBLICATIONS

Harry Pruner; Wolfgang Nesch; Spritzgiesswerkzeuge Kompakt; Ein Praxisbuch fur Einsteiger.
German Office Action; Application No. 10 2018 132 501.0; dated Nov. 27, 2019.

\* cited by examiner

MANUFACTURING METHOD FOR A CAST STATOR OF AN ELECTRIC MACHINE

RELATED APPLICATIONS

The present application is based on, and claims priority from, German Application No. DE 10 2018 132 501.0 filed Dec. 17, 2018, the disclosure of which is hereby incorporated by reference herein in its entirety.

The invention relates to a cast stator for an electric machine, in particular an electric motor, to a manufacturing method, and to a vehicle having an electric machine, in particular an electric motor, having the stator.

PRIOR ART

Electric motors are known in general and are coming into increasing use for the drive of vehicles. An electric motor comprises a stator and a rotor.

OBJECT AND SOLUTION

The object of the present invention is to provide a stator having improved thermal properties.

This object is attained using a method according to the main claim and a device according to the coordinate claim. Advantageous embodiments are the subject matter of the dependent claims.

According to the invention, a method for manufacturing a stator for an electric machine (100) has the following steps: inserting a cast body with a nozzle from a first side of the stator into the stator, inserting a cast counterbody from a second opposing side of the stator into the stator, casting the stator with a thermoplastic, thermosetting plastic, or resin by means of the nozzle, curing the thermoplastic, thermosetting plastic, or resin, wherein following curing a cast-on piece of the thermoplastic, thermosetting plastic, or resin is sheared off using a rotational movement of the cast body or cast counterbody.

The shearing off movement permits a cut edge that is even due to the shearing off and thus may also be disposed inside the stator, that is, in the region of the air gap between stator and rotor. Because of this, it is furthermore possible to begin the casting inside the stator. Beginning the casting inside the stator leads to improved curing, since the path from one end of the stator to the other end of the stator is thus shortened when the cast begins inside the stator and not on the outer edges of the stator.

The heat that is produced in the stator by the coils may be removed to the cooling circuit better by the casting, that is, by the thermoplastic, thermosetting plastic, or resin.

At least the cast body or the cast counterbody may preferably have a plurality of teeth and the rotational movement may be accomplished using at least one tooth.

By means of the teeth on at least the cast body or the cast counterbody, the shearing off of the cast-on piece may be supported and the shearing seam is more even. Moreover, one rotation via at least one tooth is sufficient for this. A rotation via two or three teeth also leads to an even seam, but a rotation that is too long runs the risk of causing damage to the cast and also increases processing time.

Furthermore preferred, the cast body and the cast counterbody may meet in the center third of the stator prior to casting. It is also possible for the cast body and the cast counterbody to meet approximately in the center of the stator.

The cast-on piece may thus occur in the center third or approximately in the center, so that curing and distribution of the thermoplastic, thermosetting plastic, or resin in both directions of the stator has essentially the same properties, because the distance to be covered to the edge of the stator is approximately equal in both directions. This improves the properties compared to a cast-on piece at the beginning of the stator.

In another embodiment of the invention, the cast-on piece may be removed from the stator by the cast body or the cast counterbody.

The cast-on piece is then pressed out of the stator by means of the cast body or the cast counterbody or both together so that the stator is fully cast. Following curing, the cast body and the cast counterbody must be removed from the stator. The cast-on piece is then pressed out of the stator during this removal.

In another preferred embodiment of the invention, the curing may occur with the additional introduction of cooling agents into cooling agent channels.

Curing may additionally be accomplished by feeding current to the coils of the stator. When feeding current to the coils, the resistance of the coils is used for heating the stator and the cast.

With the cooling agent and/or feeding the current, more rapid curing is possible and thus the processing time is shortened.

According to the invention, a device for manufacturing a stator for an electric machine comprises a cast body that may be inserted from a first side of the stator, a nozzle arranged on the cast body, a cast counterbody that may be inserted from a second opposing side of the stator, a stator retaining device, and a feed channel that is connected to the nozzle, wherein at least the cast body or the cast counterbody is rotatable.

The stator retaining device may hold the stator with housing and the cast body and cast counterbody may cast the stator inside the housing.

Molten thermoplastic, thermosetting plastic, or resin may be introduced as melt by means of the feed channel.

At least the cast body or the cast counterbody may preferably have a plurality of teeth.

The teeth make possible an even cut edge when the cast-on piece is separated and thus ensure a smooth stator interior surface for the air gap between rotor and stator.

Moreover, the cast-on piece may be separated when the tool is closed and separation thus has a more limited effect on the total cycle time.

More preferably, the cast body and the cast counterbody may be embodied such that they meet in the center third of the stator.

In another embodiment of the invention, at least the cast body or the cast counterbody may have at least one temperature control channel.

Both heating and cooling may be accomplished using this temperature control channel using, for example, air or fluid.

At least the cast body or the cast counterbody may have an ejection device.

According to the invention, a vehicle (103) has an electric machine (100), in particular an electric motor, having a stator according to a preferred embodiment or a stator that was manufactured according to one of the preferred methods.

Figure 1:
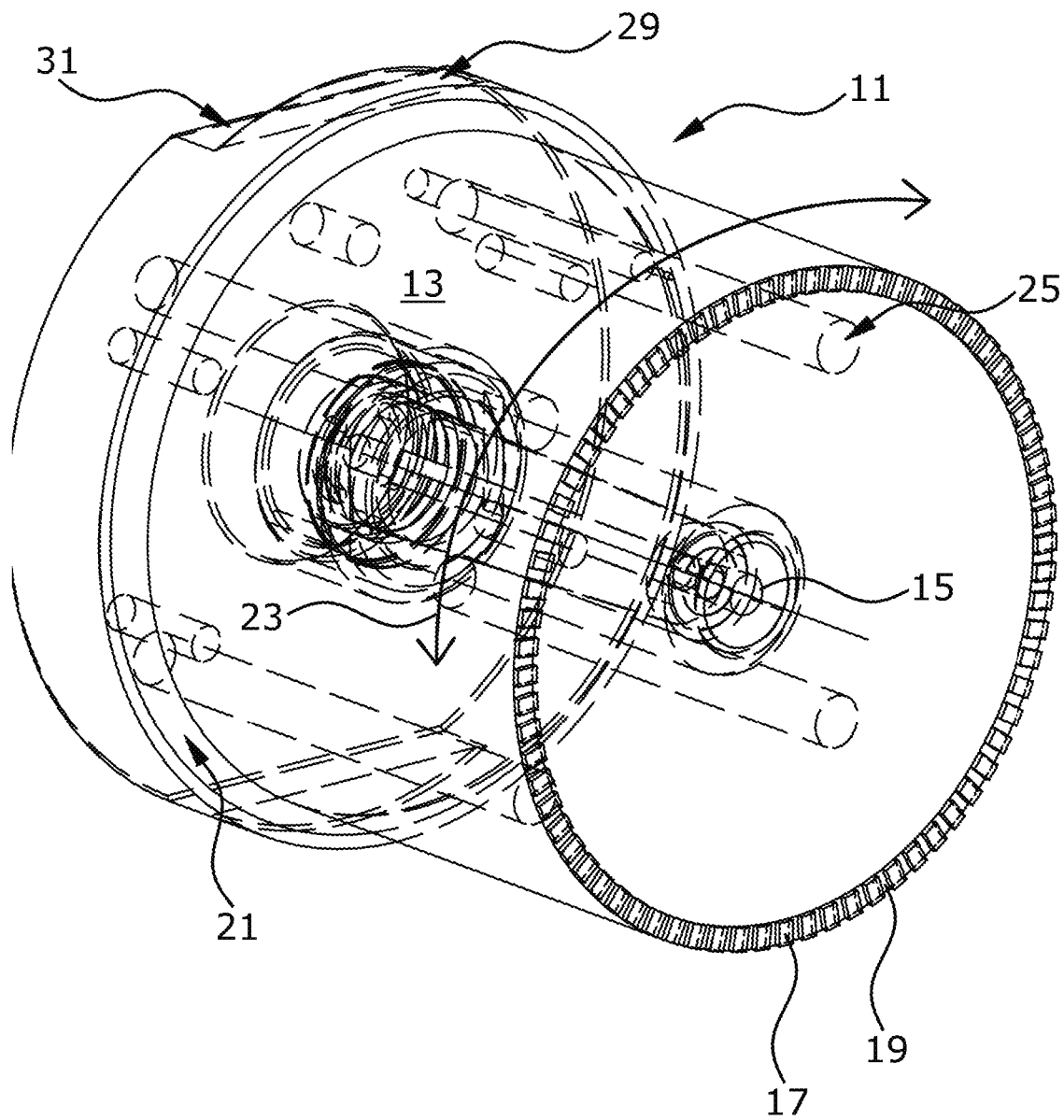
FIG. 1 illustrates a view of a cast body.

The cast body 11 illustrated in FIG. 1 includes a nozzle 15 for filling thermoplastic, thermosetting plastic, or resin into a stator. The nozzle 15 runs through the cast body 11 and may be connected outside of the stator to a thermoplastic, thermosetting plastic, or resin supply unit. The bottom body 29 has a larger diameter than the nozzle body 13, so that once the cast body 11 is inserted the stator is sealed by a circumferential edge 21. Moreover, the cast body 11 has cooling channels 25 for cooling the thermoplastic, thermosetting plastic, or resin.

Furthermore arranged on the bottom body 29 is a recess 31 that facilitates rotation 23 of the cast body 11. The teeth 17 and the spaces 19 between the teeth make it possible to shear off the cast-on piece using a rotational movement 23. The cast-on piece is created at the location at which the thermoplastic, thermosetting plastic, or resin flows into the stator.

Figure 2:
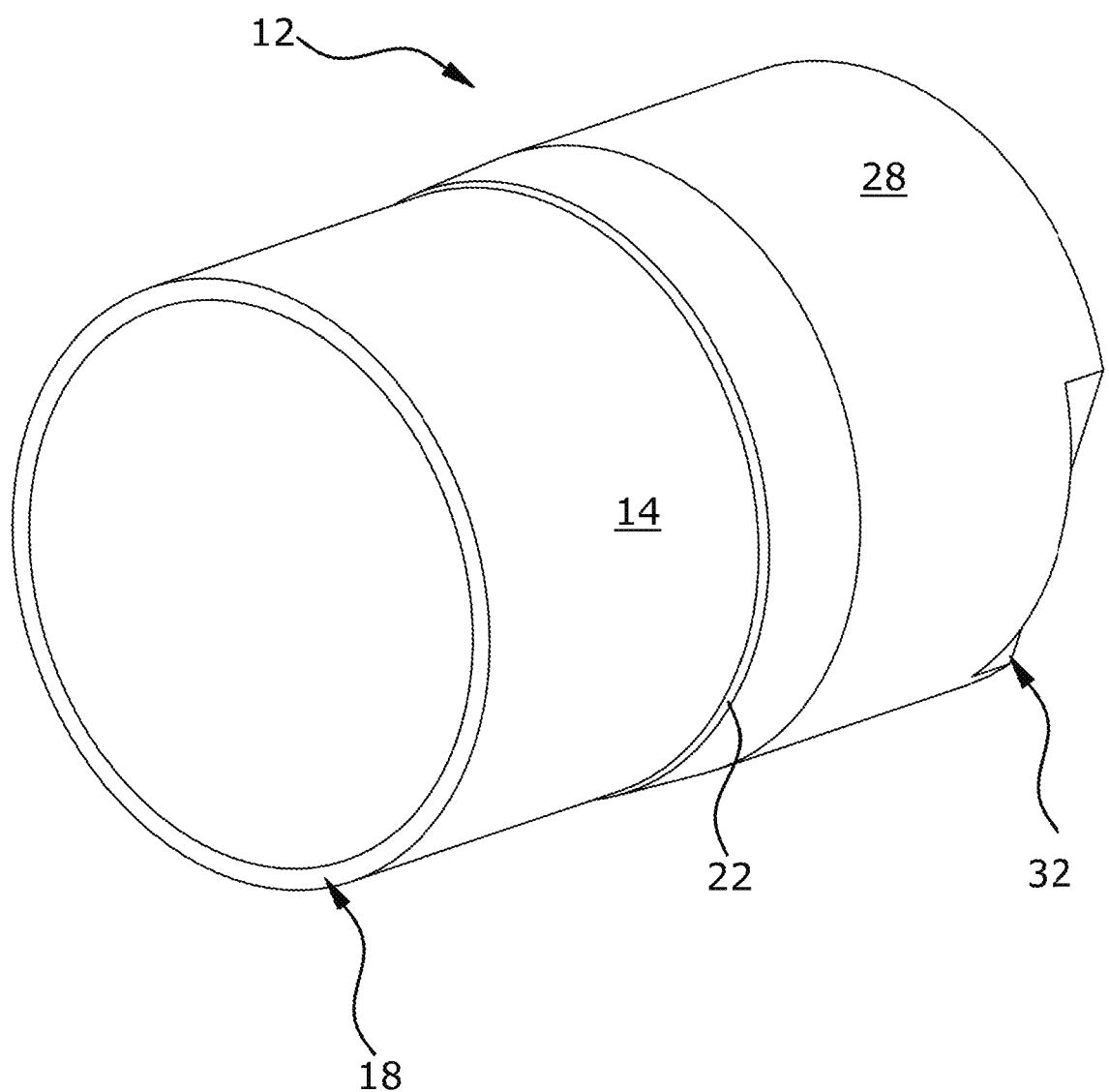
FIG. 2 illustrates a view of a cast counterbody.

The cast counterbody 12 illustrated in FIG. 2 has a flat end face 18. The bottom body 28 has a larger diameter than the end face 18. The circumferential edge 22 created thereby can seal the stator in connection with the retaining device. The bottom body 28 furthermore has a recess 32 for easier mounting of the cast counterbody 12.

Figure 3:
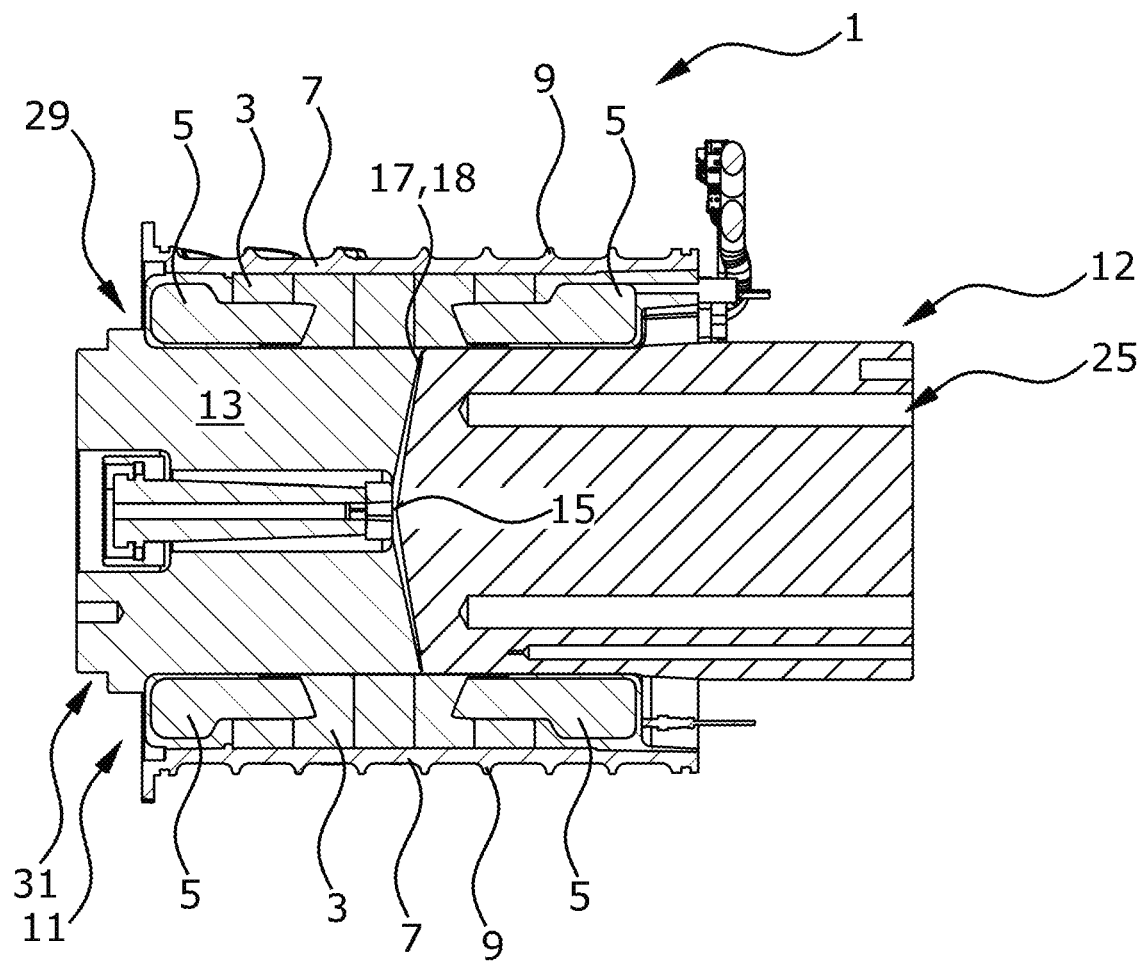
FIG. 3 illustrates a section of a cast body and cast counterbody in the interior of a stator.

FIG. 3 illustrates a cast body 11 and a cast counterbody 12 following insertion into a stator 3. The stator 3 has windings 5 that are wound about stator teeth. The stator 3 is disposed in a housing 7 having cooling line channels 9. An outer housing may also be placed over this housing so that the cooling line channels 9 form cooling channels between the housing and the outer housing.

The teeth 17 of the cast body 11 meet in the center third of the stator 3 at the end face 18 of the cast counterbody 12. Via the nozzle 15, thermoplastic, thermosetting plastic, or resin is injected into the center of the stator 3 and flows around the cast body 11 and the cast counterbody 12 to the stator. The cast-on piece that must be removed is created between the output of the nozzle and the interior circumference of the stator. This removal occurs following curing of the thermoplastic, thermosetting plastic, or resin, at least using one rotational movement of the cast body 11 or of the cast counterbody 12.

By means of the temperature control channels 25 it is possible, on the one hand, to keep the thermoplastic, thermosetting plastic, or resin fluid using heat, and on the other hand to harden the thermoplastic, thermosetting plastic, or resin more rapidly using cooling.

The bottom body 29 sealingly closes the stator. A recess 31 that supports the rotational movement using a drive is disposed at the end of the cast body 11.

Figure 4:
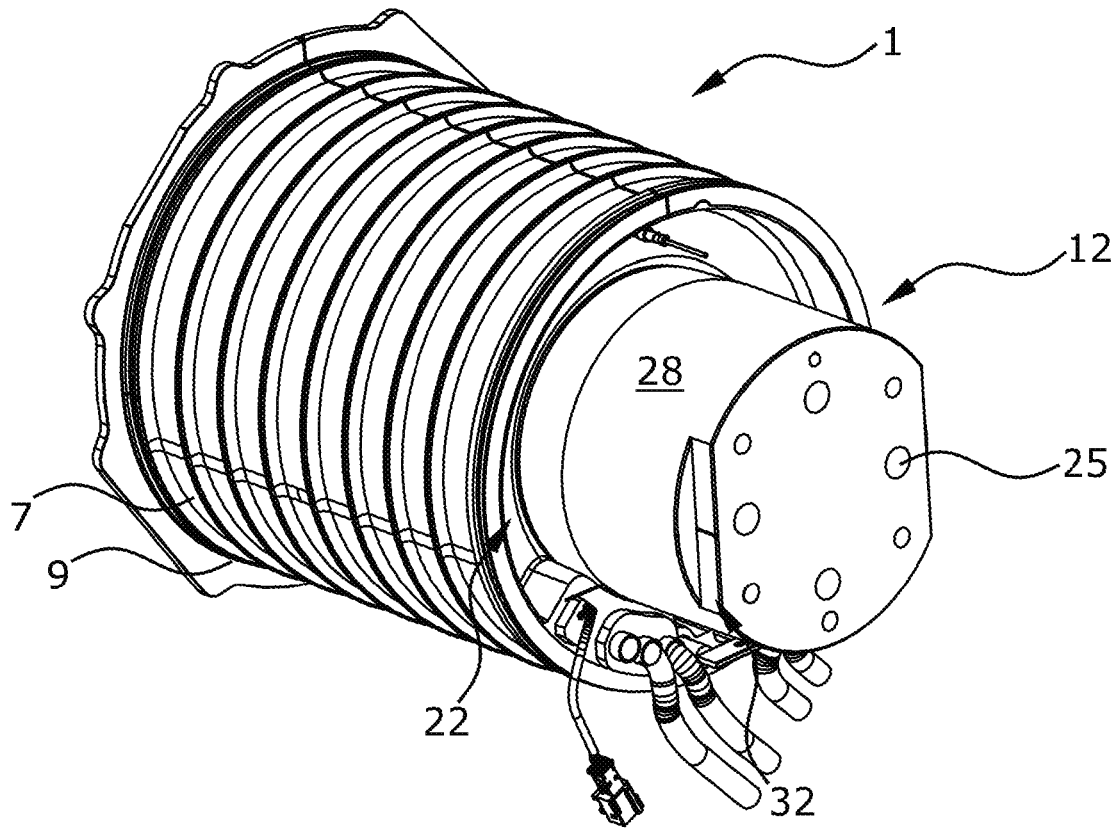
FIG. 4 illustrates a view of a cast counterbody in the interior of a stator.

FIG. 4 illustrates the cast counterbody 12 when inserted. The circumferential edge 22 is positioned on the stator and seals the stator. The temperature of the stator may be controlled using the cooling channels.

A recess 32 on the bottom body 28 also permits the cast counterbody 12 to be rotated and facilitates insertion and removal.

Figure 5:
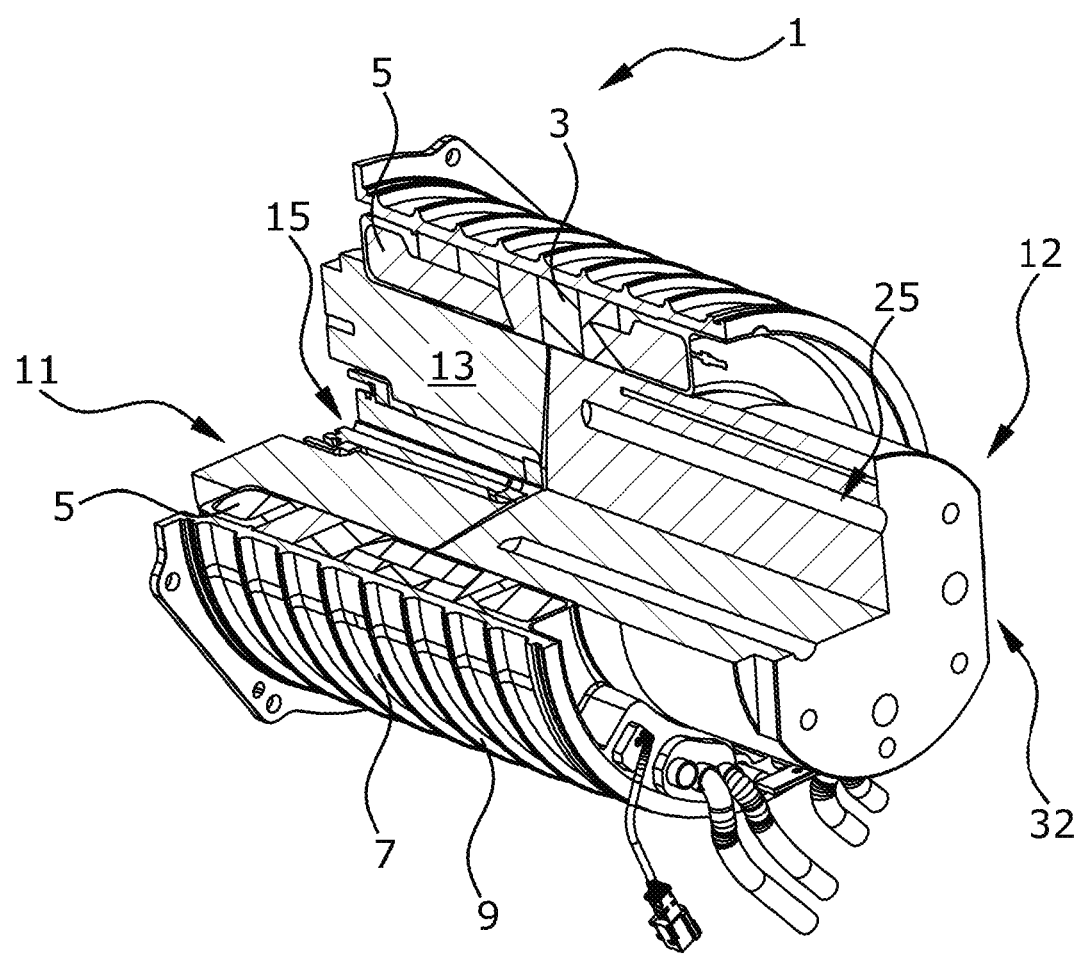
FIG. 5 illustrates a cut-away view of a cast body and cast counterbody in the interior of a stator.

FIG. 5 is a cut-away view of the device 1. The cast body 11 and the cast counterbody 12 meet inside the stator 3. Thermoplastic, thermosetting plastic, or resin is added to the interior of the stator 3 through the nozzle body 13 of the nozzle 15. Following curing, there is a rotational movement and the cast body and the cast counterbody are removed from the stator, and the cast-on piece is simultaneously removed from the stator.

Figure 6:
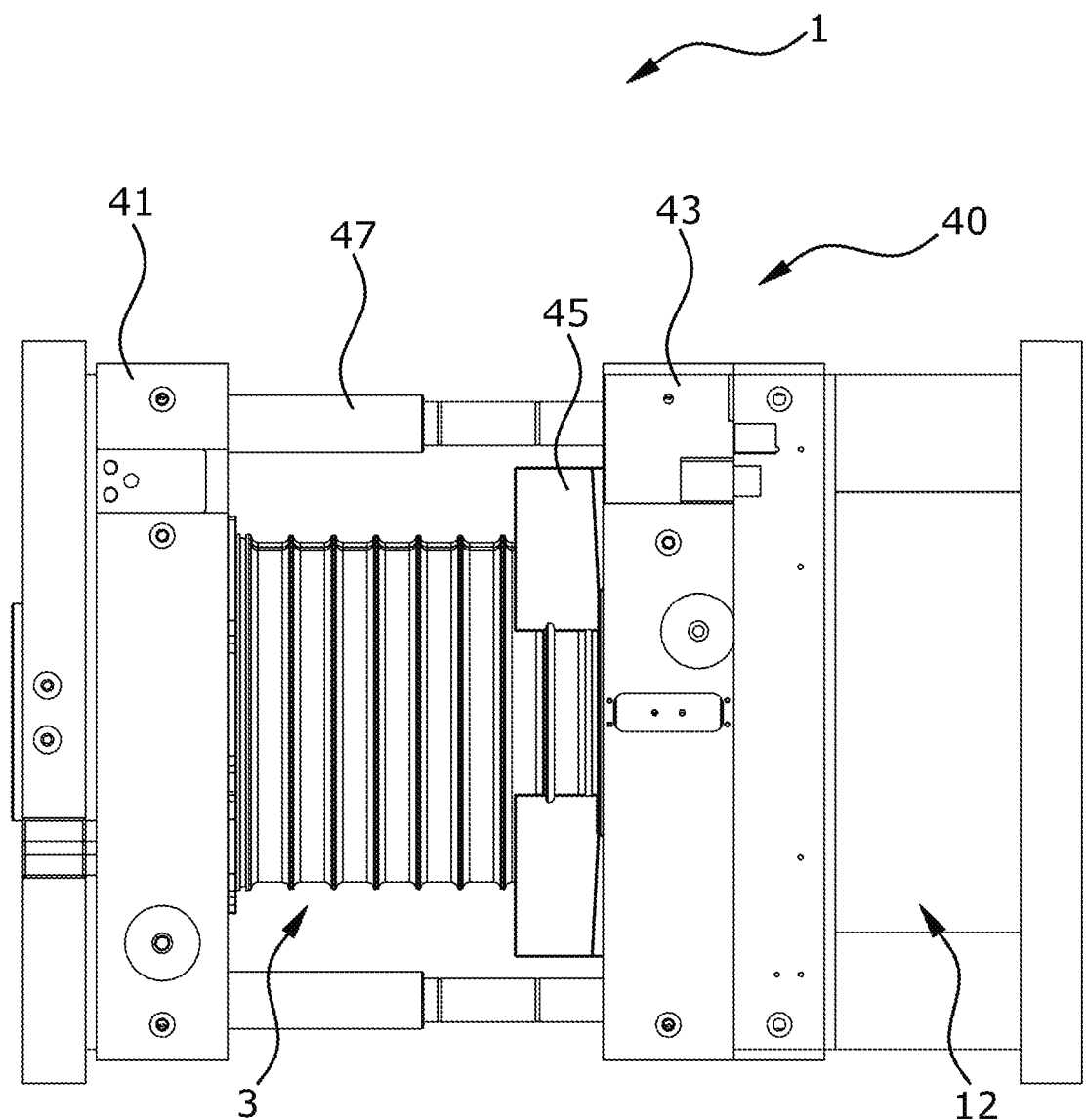
FIG. 6 illustrates a section of a cast body and cast counterbody in the interior of a stator having a two-part retaining device for the stator.

FIG. 6 illustrates the device with stator retaining unit 40. The stator retaining unit 40 comprises two retaining unit parts 41, 43, each of which acts as a guide for a cast body or cast counterbody. The stator is held in the housing, using retaining jaws 45 of the one retaining unit part 43, in a recess of the other retaining unit part 41. Provided between the retaining unit parts is a guide rod 47 that ensures the two retaining unit parts are aligned and permits the cast body 11 and the cast counterbody 12 to be precisely guided within the retaining unit parts. Because of this, the cast body 11 and the cast counterbody 12 meet one another precisely inside the stator.

Figure 7:
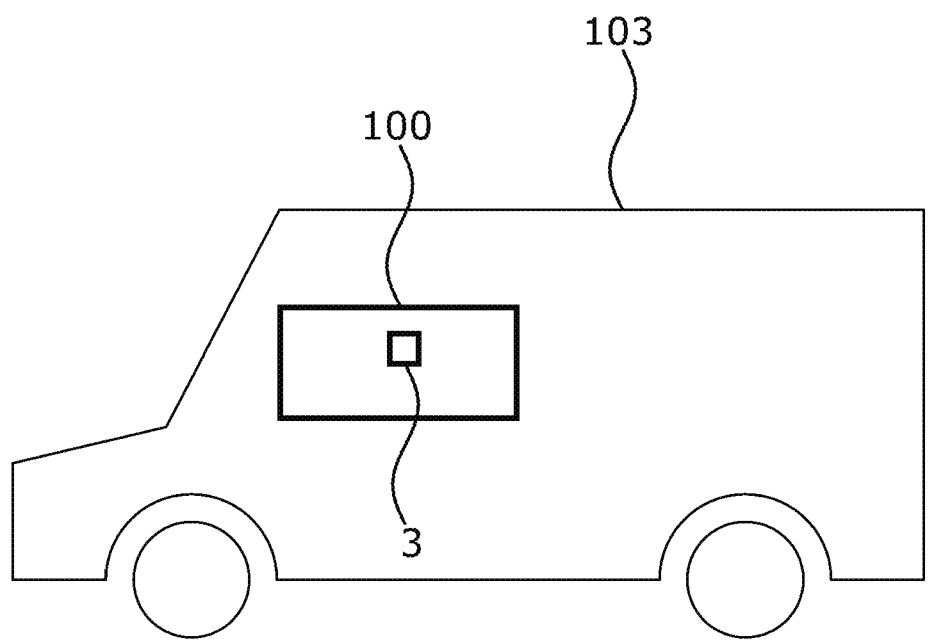
FIG. 7 illustrates a cast stator in an electric machine in a vehicle.

FIG. 7 is a sketch illustrating the principle of an exemplary embodiment of a vehicle 103, for example a hybrid vehicle or an electric vehicle, comprising an electric machine 100, in particular an electric motor, having one exemplary embodiment of the stator 3 for driving the vehicle 103.

The invention claimed is:

1. A method for manufacturing a stator for an electric machine comprising
    Inserting a cast body with a nozzle from a first side of the stator to be casted into an inside of the stator to be casted
    Inserting a cast counterbody from a second opposing side of the stator to be casted into the inside of the stator to be casted to face the cast body,
    Casting the stator with thermoplastic, thermosetting plastic, or resin by means-of through the nozzle and a space between the cast body and the cast counterbody, and
    Curing the thermoplastic, thermosetting plastic, or resin, wherein following the curing, a cast-on piece of the thermoplastic, thermosetting plastic, or resin is sheared off using a rotational movement of the cast body or cast counterbody.

2. The method according to claim 1, wherein at least the cast body or the cast counterbody has a plurality of teeth and the rotational movement is accomplished using at least one tooth.

3. The method according to claim 1, wherein the cast body and the cast counterbody meet in the center third of the stator to be casted prior to casting.

4. The method according to claim 1, wherein the cast-on piece is removed from the stator by the cast body or cast counterbody.

5. The method according to claim 1, wherein the cast body and the cast counterbody are disposed in a housing with cooling line channels to have a space therebetween for the stator to be casted, the thermoplastic, thermosetting plastic or resin being spread radially outwardly from the space in casting.

6. A device for manufacturing a stator for an electric machine, comprising:
    a cast body that is inserted into an inside of the stator to be casted from a first side of the stator to be casted,
    a nozzle arranged in the cast body,
    a cast counterbody that is inserted into the inside of the stator to be casted from a second, opposing side of the stator to be casted to face the cast body with the nozzle, a stator retaining device to hold the cast body and the cast counterbody so that the cast body and the case counterbody are disposed inside the stator to be casted, and a feed channel that is connected to the nozzle to feed thermoplastic, thermosetting plastic, or resin to a space between the cast body and the cast counterbody, wherein at least the cast body or the cast counterbody is rotatable.

7. The device according to claim 6, wherein at least the cast body or the cast counterbody has a plurality of teeth.

8. The device according to claim 6, wherein the cast body and the cast counterbody meet in a center third of the stator to be casted.

9. The device according to claim 6, wherein at least the cast body or the cast counterbody has at least one temperature control channel.

10. The device according to claim 6, wherein at least the cast body or the cast counterbody has an ejection device.

11. The device according to claim 6, further comprising a housing with cooling line channels, the case body and the cast counterbody being disposed inside the housing to form a space therebetween for the stator to be casted.

12. A vehicle comprising an electric motor having the stator manufactured according to claim 1.

\* \* \* \* \*